INVENTORS
James R. Stewart
Charles H. Willyard
BY Mueller & Aichele
Attys.

INVENTORS
James R. Stewart
Charles H. Willyard
BY Mueller & Aichele
Attys.

April 30, 1963 J. R. STEWART ETAL 3,087,999

MOBILE DIALING SYSTEM

Filed Dec. 8, 1959 3 Sheets-Sheet 3

INVENTORS
James R. Stewart
BY Charles H. Willyard.
Mueller & Aichele
Attys.

United States Patent Office 3,087,999

Patented Apr. 30, 1963

3,087,999

MOBILE DIALING SYSTEM

James Russell Stewart, Glen Ellyn, and Charles H. Willyard, Wheaton, Ill., assignors to Motorola, Inc., Chicago, Ill., a corporation of Illinois Filed Dec. 8, 1959, Ser. No. 858,105

11 Claims. (Cl. 179—84)

Figure 1:
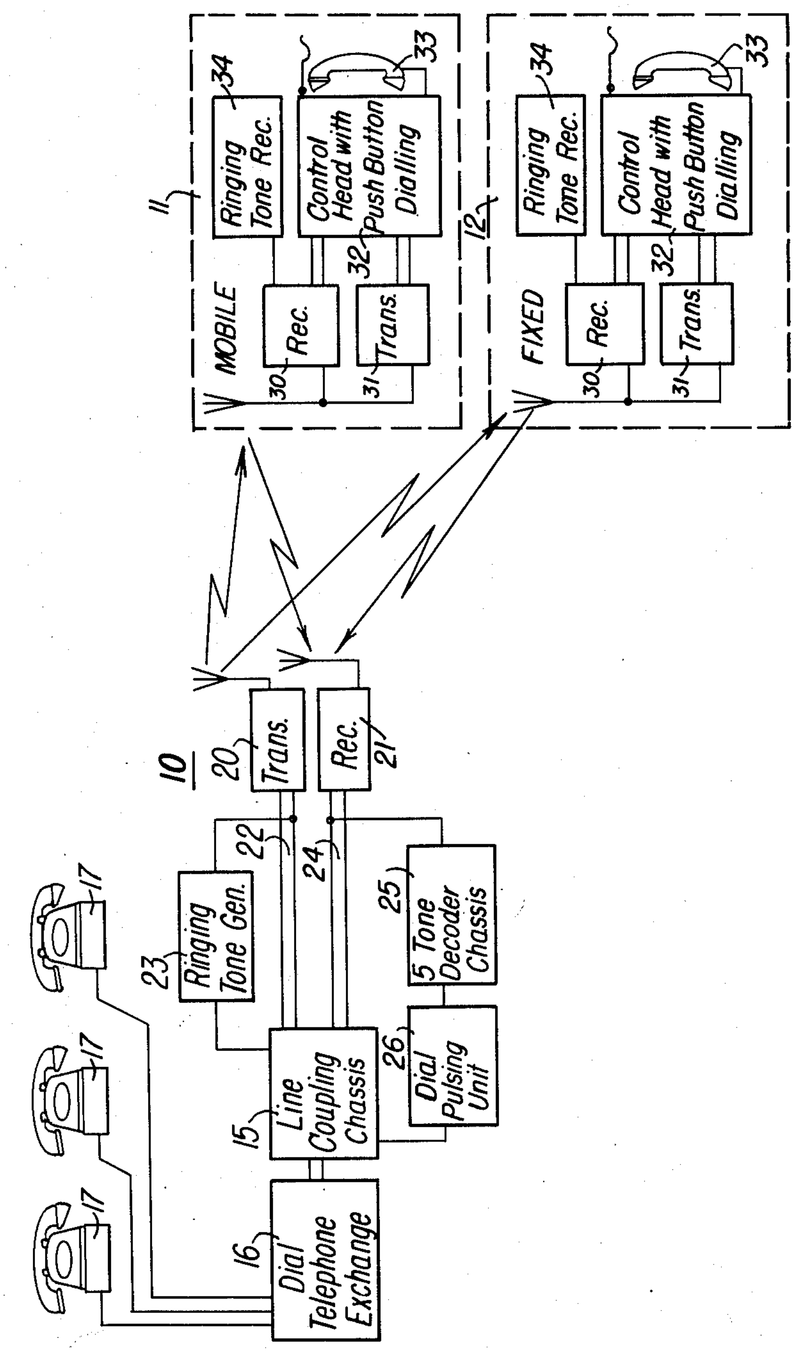

This invention relates generally to improvement in automatic radio telephone systems and in particular to that part of the system that converts received radio frequency waves from remote stations into dial pulses according to the digit dialed and transmits these pulses into a telephone exchange.

Telephone systems have used radio links to permit telephone operation with mobile vehicles or with stations in sparsely populated areas where the cost of wire lines would be prohibitive. In such systems, it has been common practice to have an operator at the exchange who makes connections between the remote stations and the telephone exchange. Although it has been proposed to provide automatic dialing equipment for use at stations connected to the telephone system by radio links, available equipment has been quite complex and has not been entirely reliable. In order to provide dial pulses into the exchange to select a called station, it is necessary to convert radio frequency waves which have been transmitted from the remote stations to standard telephone dial pulses. The equipment used to convert these radio frequency waves into dialed pulses must be reliable and must be relatively simple. Also, the equipment should operate satisfactorily even when weak signals are received from remote stations.

It is, therefore, an object of the present invention to provide an improved automatic telephone system for radio telephone use.

Another object of the invention is to provide a dialing system utilizing radio frequency waves modulated with tone frequencies which selects the tone frequencies in the presence of noise and adverse propagation effects, and in turn produces therefrom dial pulses having the same characteristics as standard pulses produced by telephone subscriber stations.

A further object of the invention is to provide a radio telephone system having a highly reliable and fail-safe dial pulsing apparatus for selection of other telephone stations.

A feature of the invention is the provision of tone frequency selector circuits which pass only predetermined tone frequencies demodulated from received radio frequency waves and converts the same to voltages applied to a digit register tube which controls a pulser tube to produce standard telephone dial pulses.

Another feature of the invention is the provision of a counter tube with ten electrodes corresponding to each of the ten digits of a telephone dial, each electrode being marked or referenced from a voltage converted from received tone combinations, and a second counter tube with ten electrodes energized in turn and coupled to the first counter tube so that rotation of ionization of all of the ten electrodes of the second counter tube occurs once for each shift of ionization from one electrode to the next in the first counter tube to produce dial pulses corresponding to the dialed digit.

A further feature of this invention is the provision of a pulser including a 100 cycle per second oscillator that causes ionization in turn of ten electrodes of a counter tube to produce dial pulses having a repetition rate of 10 per second.

Still another feature of the invention is the provision of a transistor switch circuit coupled between the first and second counter tubes to cause ionization in turn of the electrodes of the first counter tube until an idle or normal electrode is reached to terminate the pulsing operation. The switch circuit also causes operation of a pulsing relay when predetermined electrodes of the second counter tube are ionized.

An additional feature of the invention is the use of cold cathode counter tubes having a plurality of cathodes for a voltage register and dial pulser instead of a plurality of individual neon lamps to thereby provide uniform characteristics since all electrodes of the cold cathode tubes are enclosed in a single envelope. Thus, the ten electrodes of the cold cathode counter tube representing ten digits of a telephone dial all operate under the same conditions and the resulting circuit uniformity adds reliability to the telephone system.

Still another feature of the invention is the provision of a noise balance circuit which acts to prevent false dialing in response to noise pulses. It is preferred not to make connection with any telephone subscriber than to contact the wrong one.

Figure 2:
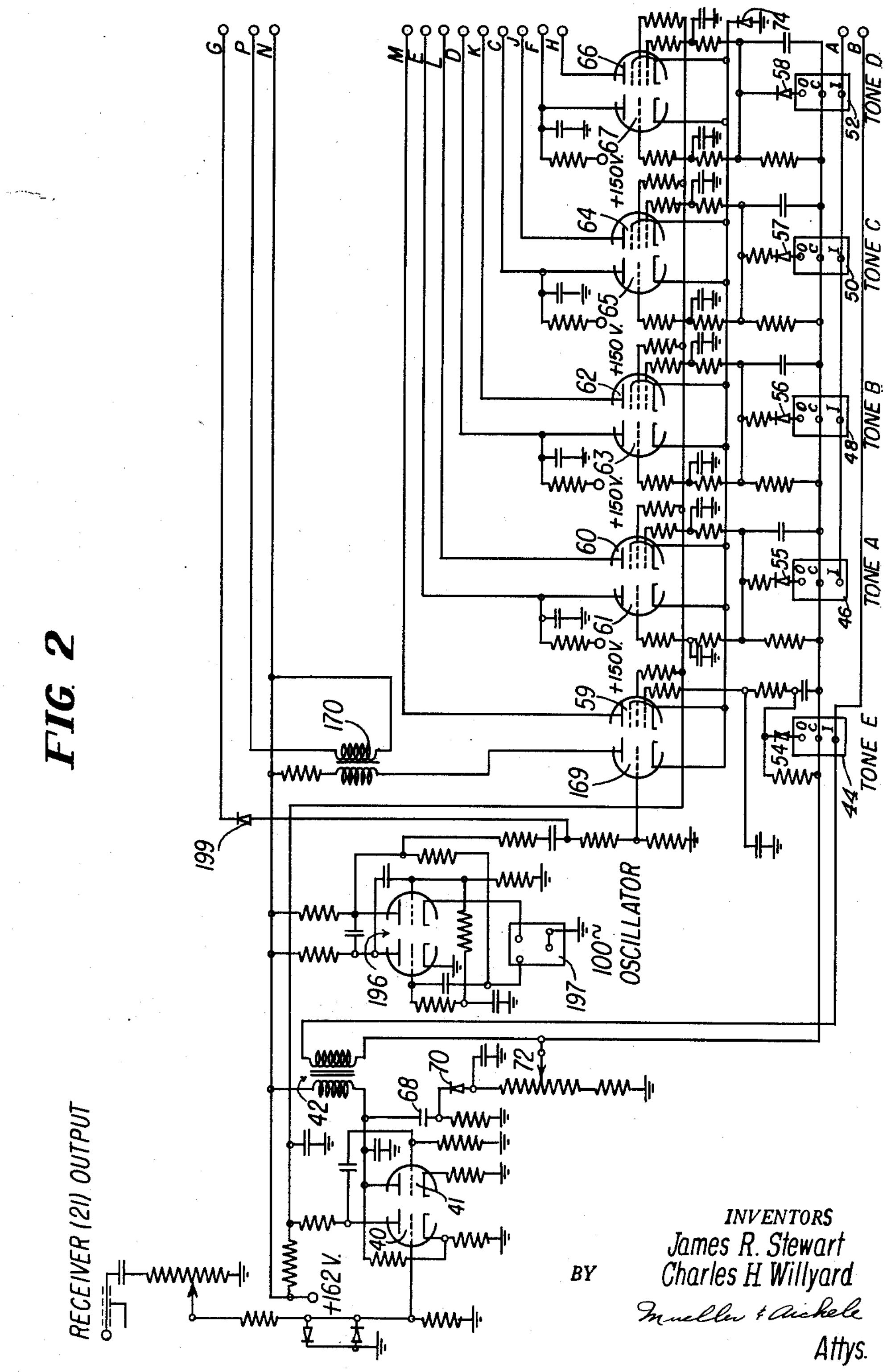
Figure 3:
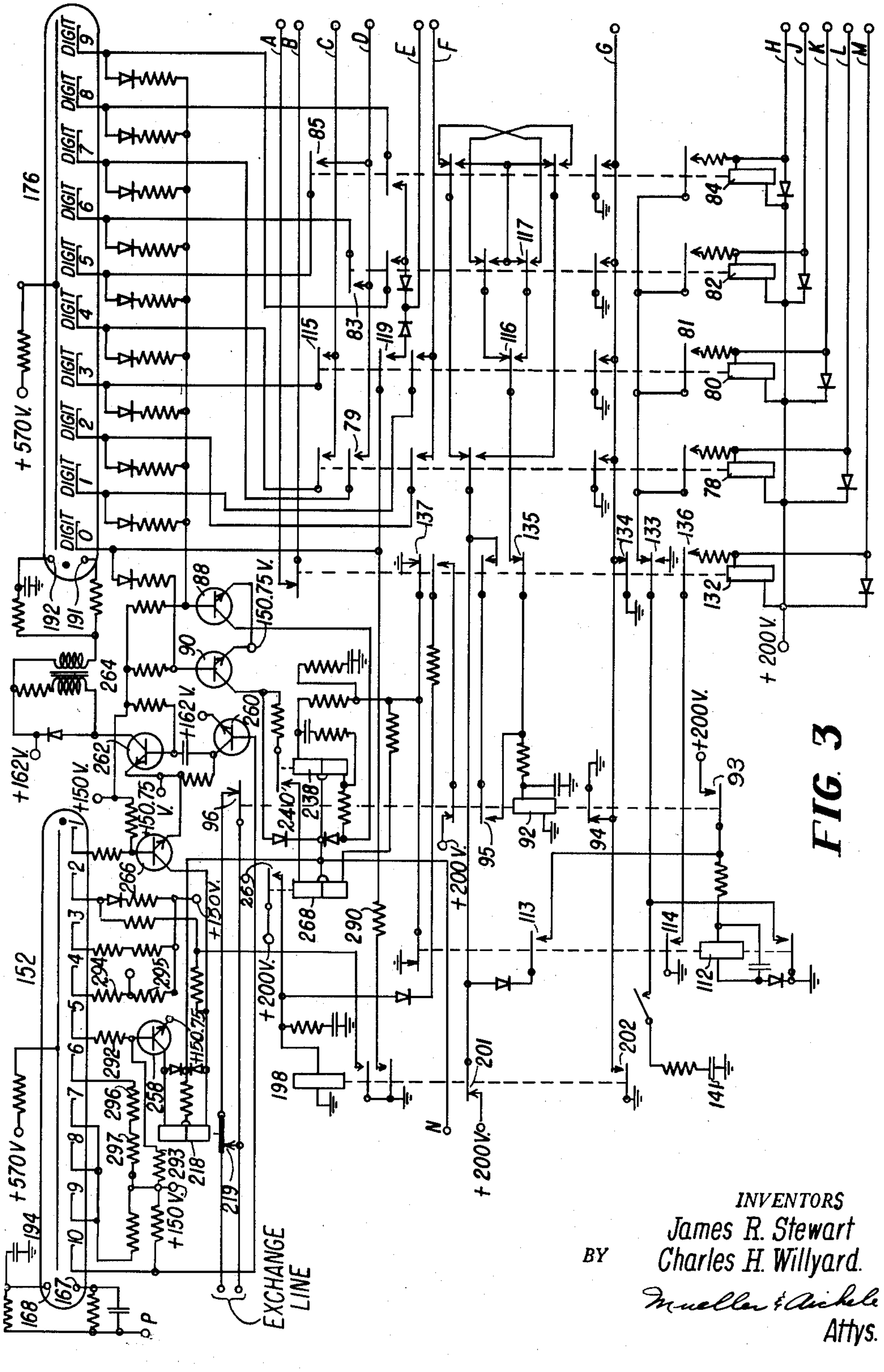

In the drawings:

FIG. 1 is a block diagram of an entire automatic telephone system of which the invention is a part; and FIGS. 2 and 3 together form a circuit diagram of the dial decoder and pulser at the base station.

In practicing the invention, there is provided an automatic telephone system wherein radio communication is provided from remote stations to a base station connected to a dial telephone exchange. The remote stations may be fixed or mobile. Dialing is provided from the remote station by transmitting to the base station radio frequency waves modulated with selected tones. Signals representing various dialed digits are combinations of two of four tones. An additional control tone is added to the selected two tones for each digit thus providing three tones for each dialed digit. The radio frequency signals are received by a decoder at the base station and the tones are demodulated. The first two tones are converted to a voltage that marks a first counter tube having ten electrodes corresponding to the ten digits of a telephone dial. This first counter tube acts as a memory device. When the third tone is received, output of a 100 cycle per second oscillator is fed to the guide pins of a second counter tube causing ionization in sequence of each of the ten electrodes of this tube. A transistor switch circuit operates when particular electrodes are ionized to actuate a relay to produce a dial pulse with a period of $\frac{1}{10}$ of a second for each complete ionization cycle of the second counter tube. The transistor switch circuit also transfers ionization in turn from the electrodes representing higher digits to lower digit electrodes of the first counter tube until the idle or normal position electrode is reached. At this point, the 100 cycle per second oscillator output is grounded and rotation of ionization of the second counter tube ceases. The pulser relay then is rendered inoperative and pulsing of the line into the exchange ceases. Thus, the number of pulsing operations depends on the digit dialed.

Referring now to the drawings, in FIG. 1 there is shown a telephone system including a terminal or base station 10 and remote or subscriber stations 11 and 12. Station 11 is shown as mobile station and 12 is a fixed station. It is to be pointed out that a plurality of mobile and/or fixed stations may be provided in the system. The terminal station 10 includes a line coupling chassis 15 which is connected as a party line to the dial telephone exchange 16. A plurality of subscriber stations 17 also are connected to the dial telephone exchange. The terminal station includes a radio transmitter 20 and a radio receiver 21. A pair of lines 22 provides signals from the line coupling chassis to the transmitter and the ringing tone generator 23 provides tones to be transmitted for selecting the individual subscriber station. Signals from the receiver 21 are applied through line 24 to the line coupling chassis 15. Signals from the receiver are also applied to the decoder chassis 25 which controls dial pulsing unit 26 which applies dial pulses to the line coupling chassis for operation of the dial telephone exchange.

Each of the remote stations includes a receiver 30 and a transmitter 31 which may be connected to the same antenna. The receiver applies signals to the control head 32 which are in turn applied to the receiver in the hand set 33. A ringing tone receiver 34 provides audible and/or visual signals when the station is called and this is controlled by signals received by the radio receiver 30. The control head 32 includes a pushbutton dialing system for applying tones to the transmitter 31 which are transmitted for controlling the decoder and pulsing unit at the terminal or base station.

Referring to FIGS. 2 and 3, the output of receiver 21 is fed to the grid of triode amplifier 40. The two triode sections 40 and 41 are connected in cascade with the amplified output being taken from the second section 41 and fed through transformer 42 and applied to tone filters 44, 46, 48, 50 and 52. Input connections of these five filters are all connected in common so that signals passed through transformer 42 can be applied to the input connection of all five tone filters. Each tone filter will pass only the desired tone frequency. Rectifiers 54, 55, 56, 57 and 58 are in series with the tone filters, and the tone signal is rectified and then applied to the grids of the pentode tube sections 59, 60, 62, 64 and 66. The pentode sections 59, 60, 62, 64 and 66 are included in the same envelope with a triode section, and each section operates as a D.C. amplifier.

Capacitor 68, rectifier 70, and potentiometer 72 form a part of a noise balance circuit connected to the output of triode 41 and common to the tone filters for the five tone frequencies designated as tones A, B, C, D and E. The purpose of this noise balance circuit is to prevent false operation of tubes 59, 60, 62, 64 and 66 when noise signals are received along with the desired wave frequencies. The noise balance circuit provides a reference negative voltage which appears on the common tie connection C of the tone filters. The cathodes of tubes 59, 60, 62, 64 and 66 are biased by rectifier 74 so that these tubes will conduct only when the voltage through the filters exceeds by a specific amount the reference voltage from the noise balance circuit. As the noise increases, a higher negative voltage will be present to offset the positive input voltage. When a certain noise level is reached, the positive voltage will not be great enough to cause circuit operation.

The pentode section of each tube provides operating voltage to tone relays 132, 78, 80, 82 and 84 in FIG. 3 through connections designated M, L, K, J and H. The triode sections 61, 63, 65 and 67 send a marking or control voltage to counter tube 176 in FIG. 3 through connections E, D, C and F. A marking voltage is not applied to counter tube 176 until the second tone has been received. In every instance, when the first tone is received the related tone relay locks. Upon receipt of the second tone, marking voltage is applied to the counter tube 176 through contacts of the tone relay which was actuated. Voltages from the triode sections 61, 63, 65 and 67 serve as an indication to counter tube 176 the digit which has been dialed. Cathodes of counter tube 176, except the idle position cathode which represents digit 0, are connected to the base of transistor 88. Digit 0 cathode is connected to the base of transistor 90. The unique operation of the counter tube when digit 0 is dialed will be explained later.

When the second tone is received, relay 92, the checking relay, is energized through closed contacts of the two operated tone relays. Relay 112, the checking slave relay, is energized by closing of contact 93 on relay 92. When the third or control tone E common to all digit tone combinations is received, relay 132 operates and locks. Tone relay 132 is actuated by the voltage from the pentode section 59. When relay 132 closes, the two previously closed tone relays open as contact 133 opens on relay 132. Also, the connection to ground through contacts 134 of relay 132 is removed and the 100 cycle per second oscillator output is applied through transformer 170, to guide pins 167 and 168 of pulser tube 152. Tubes 152 and 176 may be identical counter tubes, but tube 152 will be referred to as a pulser tube. The cycle of ionization of the pulser tube electrodes occurs at a rate of ten per second. For every position of counter tube 176, pulser tube 152 rotates through one complete cycle of ionization. Thus, if counter tube 176 was five positions from the home or idle position (digit 0), the pulser tube would make five revolutions before the counter tube reached 0. When the pulser tube rotates through one complete cycle, the telephone exchange loop line is opened and closed once to provide a pulse period of $\frac{1}{10}$ second which is the standard telephone dial pulse period.

The 100 cycle per second oscillator includes the tube 196 and a frequency controlling device 197. The oscillator output is selectively grounded through rectifier 199 connected through conductor G to contacts of relays 78, 80, 82, 84, 132, and 198. The oscillations are amplified by triode 169 and applied through transformer 170 and conductor P to guide pin 167. The oscillations are applied to pin 168 of the pulser tube 152 after being applied to pin 167 because of charging capacitor 194 on guide pin 168.

The pulser tube 152 controls the pulsing relay 218 to selectively close the line to the exchange, and also controls transistors 260 and 262 to cause counter tube 176 to transfer ionization from one cathode to the next. As counter tube 176 rotates and reaches the idle position (digit 0), relay 198, the digit stop relay, closes. Relay 198 closes only when digit 0 position of the counter tube is reached and operation of relay 198 releases all previously seized equipment.

Thus, counter tube 176 registers or marks the digit dialed by a remote telephone station and pulser tube 152 controls pulsing relay 218 which opens and closes the loop line into the telephone exchange.

A typical circuit operation will be described assuming that digit 3 has been dialed from a remote station. Digit 3 consists of tone B, tone C, and tone E.

When tone B passes through tone filter 48, the pentode plate voltage of tube 62 locks relay 80 momentarily through capacitor 141 in the line coupling unit connected through back contact 133 of relay 132 to a made contact 81 of relay 80.

When tone C is passed through tone filter 50, relay 82 is locked by the pentode plate voltage of tube 64 through contact 133 of relay 132. When tone B is received, a control voltage from triode 63 is applied to contacts 79, 83 and 85 of relays 78, 82 and 84. Since none of these relays had closed, no control or marking voltage from triode 62 passed to the counter tube 176 electrodes. However, after tone C relay 82 operates, the control voltage from triode 65 passes through closed contacts 115 of relay 80 (operated by tone B) to digit 3 cathode of counter tube 176. Thus, before a control voltage registers on counter tube 176, it is necessary for two tones to be applied before a path can be completed to the counter tube.

Continuing the example, control voltage applied to digit 3 cathode lowers the cathode voltage below 150 volts and digit 3 cathode ionizes while digit 0 cathode extinguishes. Digit 0 cathode of the counter tube, it will be remembered, is the normal or idle position of the counter tube when a digit has not been dialed. When digit 3 cathode of the counter tube ionizes, the base voltage of transistor 88 rises above 150.75 volts so that the emitter voltage is lower than the base voltage and transistor 88 conducts current through relay 238, the off-normal relay. The emitter voltage of transistor 88 is normally 150.75 volts. Consequently, the base voltage must exceed 150.75 volts before transistor 88 conducts and closes relay 238. When relay 238 closes, contact 240 of relay 238 closes.

Check relay 92 was energized through contact 135 of relay 132 and through contacts 116 and 117 of closed relays 80 and 82 which operated when tones B and C were received. Relay 112, the check slave relay, was operated in turn through contact 93 of relay 92 and relay 112 is locked at contact 113 through a back contact 201 of relay 198, the digit stop relay.

When tone E, the third tone and also the control tone for dialed digit 3, is received, relay 132 closes through pentode section 59 and locks at contact 136 through a made contact 114 of relay 112. When relay 132 closes, tone relays 80 and 82 are released. Relays 80 and 82 operated when the first two tones were received.

Also, when relay 132 operates, shorting ground contact 134 of relay 132 is removed from the 100 cycle per second oscillator and its signal is fed to triode section 169 which drives transformer 170 into saturation at 100 times per second. The dips in B+ voltage on the secondary of transformer 170 ionize guide pins 167 and 168 of pulser tube 152, thereby transferring ionization from idle position cathode 2 to cathode 3, to cathode 4 and so forth as long as guide pins 167 and 168 of tube 152 continue to receive pulsing voltages from transformer 170.

When cathode number 5 of the pulser tube ionizes, transistor 258 conducts and current flows through pulsing relay 218. Transistor 258 conducts in a manner similar to transistor 88 in that the base voltage of transistor 258 is increased above its emitter voltage of 150.75 volts. Contact 219 of relay 218 opens the loop closure into the dial exchange.

Ionization of the pulser tube continues to rotate and when pin number 10 cathode becomes ionized, transistors 260 and 262 place a surge voltage into transformer 264. A dip in B+ voltage of the secondary of transformer 264 ionizes guide pins 191 and 192 of counter tube 176 thereby transferring ionization from digit 3 cathode to digit 2 cathode.

Ionization is transferred to number 1 cathode of pulser tube 152. Transistor 266 then conducts because the base voltage exceeds the emitter voltage of 150.75 volts. When transistor 266 conducts, current flows through pulsing relay 218 again closing contact 219 of relay 218 which closes the loop line into the dial exchange through contact 96 of relay 92. The first of three dial pulses associated with dialed digit 3 is complete.

Thus, while six pulser tube cathodes (pins No. 5 through No. 10) are being ionized, the loop line is opened and while the remaining four cathodes (No. 1 through No. 4) are ionized the loop is closed. The guide pins between the ten cathodes are actuated by the 100 cycle oscillator and the rotation of ionization is complete in one-tenth of a second, the standard telephone dial pulse duration.

The loop closure was pulsed three times to correspond with dialed number 3. Pulser tube 152 and counter tube 176 continue rotation of ionization until digit 0 cathode of counter tube 176 is reached. When digit 0 is reached, transistor 90 becomes unbiased and current flows through closed contact 240 of relay 238, the off-normal relay, and through relay 268, the stop relay. Contact 269 of stop relay 268 is then closed. Unbiasing of transistor 90 is a repetition of the action described for transistors 258 and 88. In other words, the base voltage of transistor 90 is increased above its emitter voltage of 150.75 volts and transistor 90 conducts current to relay 238. Relay 198, the digit stop relay, operates from contact 269 of stop relay 268 and places a ground 202 on the output of the 100 cycle oscillator. When the oscillator output is grounded, pulser tube 152 stops rotation of ionization. Also, a 220,000 ohm resistor 290 is placed on digit 0 cathode of counter tube 176 holding it in digit 0 position. Locking voltage for relay 112 at contact 113 and relay 92 at contact 95 is removed and relays 112 and 92 are released. In turn, relay 132 is released.

When relay 132, the tone E relay, releases, a ground at contact 137 is placed on relay 238 and relay 268 removing the locking voltage on relay 198 applied at contact 269 of relay 268, and relay 198 is released. When relay 198 releases, the decoder dial pulsing circuit shown in FIGS. 2 and 3 returns to an idle or normal condition.

Since digit 0 of the counter tube 176 is the idle or normal position, a rather unique situation arises if digit 0 is dialed. Digit 0 consists of tone combinations B, A and E. When digit 0 is dialed, tone B closes relay 80. Upon receipt of tone A, the control or marker voltage from triode section 61 strikes digit 0 cathode in the counter tube 176 through contact 119 of relay 80 which was actuated by tone B received previously. Although digit 0 cathode is already ionized, transistor 90 becomes unbiased because of an increase in base voltage but contact 240 of relay 238 is open and no current flows through transistor 90 at this time. However, when tone E is received, the same sequencing of counter tube and pulser tube takes place as described in the example for dialed digit 3.

Thus, tone E closes relay 132 through pentode section 59 and locks at 136 through a made contact 114 of relay 112 which closes after receipt of the second tone A. When relay 132 operates, the shorting ground at contact 134 of relay 132 is removed from the 100 cycle per second oscillator and a signal is fed to triode section 169.

Triode section 169 drives transformer 170 into saturation at 100 times per second. The dips in B+ voltage on the secondary of transformer 170 ionize the guide pins 167 and 168 of pulser tube 152, thereby transferring ionization from cathode 2, the idle position, to number 3 to number 4 and so on as long as guide pins 167 and 168 continue to receive pulsing voltages from transformer 170.

When cathode 5 of the pulser tube ionizes, transistor 258 conducts and current flows through pulsing relay 218. Contact 219 of relay 218 opens which in turn opens the loop closure into the dial exchange.

Ionization of pulser tube 152 continues to rotate and when pin number 10 cathode becomes ionized transistors 260 and 262 place a surge voltage into transformer 264 causing a dip in the B+ voltage of the secondary and this ionizes guide pins 191 and 102 of counter tube 176 and ionization is transferred from digit 0 cathode to digit 9 cathode. As soon as ionization is transferred from digit 0 to digit 9 cathode of the counter tube, transistor 90 returns to a bias condition and transistor 88 becomes unbiased and conducts current to relay 238 causing it to close. Thus, counter tube ionization rotates from digit 9 cathode through to digit 0 cathode pulsing the line 10 times corresponding to the zero digit which was dialed.

Changes in the make-break ratio of the dial pulsing relay can be made by moving the base connection of transistor 258 from the normal junction of resistors 292—293 for 60 percent open-40 percent closed to the junction of resistors 294—295 for 70 percent open-30 percent closed operation. Operation at 50 percent open-50 percent closed likewise may be achieved by moving the tie-in to resistors 296—297.

When the ionization in pulser tube 152 reaches position 10, transistor 260 conducts as the base voltage exceeds 150.75 volts. When transistor 260 conducts, transistor 262 likewise conducts since the base of transistor 262 is connected through a capacitor to the collector of conducting transistor 260. As described in the previous example, when pin 10 of the pulser tube is ionized, transistors 260 and 262 place a surge voltage into transformer 264. The dip in the B+ of the secondary of transformer 264 ionizes guide pins 191 and 192 of counter tube 176 transferring ionization from the higher cathode digit numbers to the lower cathode digit numbers until digit 0, the idle position, is reached.

The invention, therefore, provides an improved automatic telephone system for radio telephone use wherein radio frequency waves modulated with tone frequencies are demodulated so that tone frequencies are selected in the presence of noise so that dial pulses are produced having standard telephone dial pulse characteristics. The system of the invention provides highly reliable and fail-safe selection of other telephone stations.

What is claimed is:

1. In a telephone system for providing automatic operation between a dial telephone exchange and remote stations connected by radio to said exchange, and wherein said remote stations produce radio frequency waves modulated by tones of particular frequencies to identify the digits of a dialed number, the combination including, receiver means for deriving tones from the received wave, selective means coupled to said receiver means and responsive to tones of predetermined frequencies, register means including a first counter tube having a plurality of electrodes, means connecting said electrodes to said selective means for selectively energizing the same in response to received tones of predetermined frequencies, and pulsing means coupled to said register means including a pulse source and a second counter tube, said second counter tube including a plurality of electrodes energized in sequence in response to pulses from said pulse source, said pulsing means including circuit means coupled to predetermined ones of said electrodes of said second tube and responding to energization thereof to provide dial pulses, said circuit means being coupled to said first counter tube for applying pulses thereto in response to energization of a predetermined electrode of said second tube to cause said electrodes of said first tube to be energized in sequence until a particular electrode of said first tube is reached, said circuit means being coupled to said particular electrode and being responsive to energization thereof to terminate the pulsing operation.

2. In a telephone system for providing automatic operation between a dial telephone exchange and remote stations connected by radio to said exchange, and wherein said remote stations produce radio frequency waves modulated by tones of particular frequencies to identify the digits of a dialed number, the combination including, receiver means for deriving tones from the received wave, selective means coupled to said receiver means and responding to tones of predetermined frequencies to provide tone voltages, noise balance means coupled to said receiver means and producing a noise voltage proportional to the noise level of the received waves, control means responsive to said tone voltages and to said noise voltage to produce a control voltage when a tone voltage exceeds said noise voltage by a predetermined amount, register means including a first counter tube having a plurality of electrodes, means connecting said electrodes to said control means for selectively energizing the same in response to said control voltages, and pulsing means coupled to said register means including a pulse source and a second counter tube, said second counter tube including a plurality of electrodes energized in sequence in response to pulses from said pulse source, said pulse means including circuit means responding to energization of predetermined ones of said electrodes of said second tube to provide dial pulses, said circuit means being coupled to said first counter tube and applying pulses thereto to cause said electrodes of said first tube to be energized in sequence until a particular electrode is reached, said circuit means being coupled to said particular electrode and being responsive to energization thereof to terminate the pulsing operation.

3. In a telephone system for providing automatic operation between a dial telephone exchange and remote stations connected by radio to said exchange, and wherein said remote stations produce radio freqency waves modulated by tones of particular frequencies to identify the digits of a dialed number, the combination including, receiver means for deriving tones from the received wave, selective means coupled to said receiver means and including five portions responsive respectively to tones of five different frequencies for selectively producing five tone voltages, register means including a first counter tube having a plurality of electrodes, means connecting said electrodes to four of said portions of said selective means for selectively energizing one of said electrodes in response to two of said tone voltages applied simultaneously, control means coupled to said fifth portion of said selective means and responsive to said tone voltage produced thereby for initiating operation of said register means, and pulsing means coupled to said register means including a pulse source and a second counter tube, said second counter tube including a plurality of electrodes energized in sequence in response to pulses from said pulse source, said pulsing means including circuit means coupled to predetermined ones of said electrodes of said second tube and responsive to energization thereof to provide dial pulses, said circuit means being coupled to said first counter tube for applying pulses thereto to cause said electrodes thereof to be energized in sequence until a particular electrode thereof is reached.

4. In a telephone system for providing automatic operation between a dial telephone exchange and remote stations connected by radio to said exchange, and wherein said remote stations produce radio frequency waves modulated by tones of particular frequencies to identify the digits of a dialed number, the combination including, receiver means for deriving tones from the received wave, selective means coupled to said receiver means and responsive to tones of predetermined frequencies, register means including a first counter tube having a plurality of electrodes, means connecting said electrodes to said selective means for selectively energizing the same in response to received tones of predetermined frequencies, and pulsing means coupled to said register means including a pulse source producing pulses at a rate of 100 per second and a second counter tube, said second counter tube including a plurality of electrodes energized in sequence in response to pulses from said pulse source, said pulsing means including circuit-means coupled to predetermined ones of said electrodes of said second tube and responding to energization thereof to provide dial pulses having periods of $\frac{1}{10}$ second duration, said circuit means being coupled to said first counter tube to apply pulses thereto in response to energization of a predetermined electrode of said second counter tube to cause said electrodes of said first tube to be energized in sequence until a particular electrode thereof is reached, and means coupled to said particular electrode of said first tube and responsive to energization thereof to terminate the pulsing operation.

5. In a telephone system for providing automatic operation between a dial telephone exchange and remote stations connected by radio to said exchange, and wherein said remote stations produce radio frequency waves modulated by tones of particular frequencies to identify the digits of a dialed number, the combination including, a receiver means for deriving tones from the received wave, selective means coupled to said receiver means and responsive to tones of predetermined frequencies, register means including a first counter tube having a plurality of electrodes, means connecting said electrodes to said selective means for selectively energizing the same in response to received tones of predetermined frequencies, pulsing means coupled to said register means including pulse source and a second counter tube, said second counter tube including a plurality of electrodes energized in sequence in response to pulses from said pulse source, said pulsing means including means coupled to predetermined ones of said electrodes of said second tube and responding to energization thereof to provide dial pulses, and a transistor circuit connected to said first counter tube and said second counter tube, said transistor circuit being connected to a predetermined electrode of said second tube and being responsive to energization thereof for applying pulses to said first tube for causing said electrodes of said first tube to be energized in sequence until a particular electrode of said first tube is reached.

6. In a telephone system for providing automatic operation between a dial telephone exchange and remote stations connected by radio to said exchange, and wherein said remote stations produce radio frequency waves modulated by tones of particular frequencies to identify the digits of a dialed number, the combination including, receiver means for deriving tones from the received wave, selective means coupled to said receiver means and responsive to tones of predetermined frequencies, register means including a first counter tube having ten electrodes representing the digits of a dialed number, with the one of said electrodes representing the 0 digit also forming the home position of said first counter tube, means connecting said electrodes to said selective means for selectively energizing the same in response to received tones of predetermined frequencies, and pulsing means coupled to said register means including a pulse source producing pulses at a rate of 100 per second, a second counter tube including ten electrodes energized in sequence in response to pulses from said pulse source, a pulse relay, and a transistor circuit coupled to predetermined ones of said electrodes of said second tube, said transistor circuit being coupled to said pulse relay and operating the same in response to energization of said electrodes of said second tube to provide dial pulses having periods of $\frac{1}{10}$ second duration, said transistor circuit being coupled to said first counter tube and applying pulses thereto in response to energization of predetermined electrode of said second tube to cause said electrodes of said first tube to be energized in sequence until said electrode thereof representing the 0 digit is reached, and means coupled to said electrode of said first tube representing the 0 digit and to said pulse relay and responsive to energization of said electrode representing the 0 digit to terminate the pulsing operation after said pulse relay has operated.

7. In a telephone system for providing automatic operation between a dial telephone exchange and remote stations connected by radio to said exchange, and wherein said remote stations produce radio frequency waves modulated by tones of particular frequencies to identify the digits of a dialed number, the combination including, receiver means for deriving tones from the received wave, selective means coupled to said receiver means and responsive to tones of predetermined frequencies, register means including a first counter tube having a plurality of electrodes, means connecting said electrodes to said selective means for selectively energizing the same in response to received tones of predetermined frequencies, and pulsing means coupled to said register means including a pulse source producing pulses at a rate of 100 per second, a second counter tube coupled to said pulse source and having ten electrodes energized in sequence in response to pulses, a pulse relay, and a transistor circuit, said transistor circuit coupling predetermined ones of said electrodes of said second tube to said pulse relay and responding to energization of said electrodes to operate said relay to provide dial pulses during energization of six of said electrodes to provide a pulse duration of 60 milliseconds, said relay being released during energization of four of said electrodes for a duration of 40 milliseconds, said transistor circuit being coupled to said first counter tube and applying pulses thereto in response to energization of a predetermined electrode of second tube to cause said electrodes of said first tube to be energized in sequence until a particular electrode thereof is reached, and means coupled to said particular electrode of said first tube and responsive to energization thereof to terminate the pulsing operation.

8. In a telephone system for providing automatic operation between a dial telephone exchange and remote stations connected by radio to said exchange, and wherein said remote stations produce radio frequency waves modulated by tones of particular frequencies to identify the digits of a dialed number, the combination including, receiver means for deriving tones from the received wave, selective means coupled to said receiver means and responsive to tones of predetermined frequencies, register means including a first counter tube having ten electrodes, means connecting said electrodes to said selective means for selectively energizing the same in response to received tones of predetermined frequencies, one of said electrodes forming the home position and being energized for digit 0, with the remaining electrodes being energized for digits 1 through 9 respectively, pulsing means coupled to said register means, a first relay connected to said remaining electrodes and holding said pulsing means operative when such electrodes are energized, and a second relay connected to said one electrode through said first relay and operating when said one electrode is energized after said first relay has been actuated, said second relay being connected to said pulsing means to terminate the pulsing operation.

9. In a telephone system for providing automatic operation between a dial telephone exchange and remote stations connected by radio to said exchange, and wherein said remote stations produce radio frequency waves modulated by tones of particular frequencies to identify the digits of a dialed number, the combination including, receiver means for deriving tones from the received wave, selective means coupled to said receiver means and responsive to tones of predetermined frequencies, register means including a first counter tube having ten electrodes, means connecting said electrodes to said selective means for selectively energizing the same in response to received tones of predetermined frequencies, one of said electrodes forming the home position and being energized for digit 0, with the remaining electrodes being energized for digits 1 through 9 respectively, pulsing means coupled to said register means, a first relay connected to said remaining electrodes and holding said pulsing means operative when such electrodes are energized, said pulsing means including a pulse source producing pulses at a rate of 100 per second, a second counter tube having ten electrodes energized in sequence in response to pulses from said pulse source, a pulse relay and a transistor circuit coupling said relay to predetermined ones of said electrodes of said second tube and responding to energization thereof to provide dial pulses having periods of $\frac{1}{10}$ second duration, said transistor circuit being coupled to said first counter tube and applying pulses thereto in response to energization of a predetermined electrode of second tube to cause said electrodes of said first tube to be energized in sequence until said electrode thereof representing the 0 digit is reached, and a second relay connected to said electrode representing digit 0 through said first relay and operation when such electrode is energized after said first relay has been actuated, said second relay being connected to said pulsing means to terminate the pulsing operation.

10. In a telephone system for providing automatic operation between a dial telephone exchange and remote stations connected by radio to said exchange, and wherein said remote stations produce radio frequency waves modulated by tones of particular frequencies to identify the digits of a dialed number, the combination including, receiver means for deriving tones from the received wave, selective means coupled to said receiver means and including portions responsive to tones of five different frequencies for selectively producing five tone voltages, noise balance means coupled to said receiver means and producing a noise voltage proportional to the noise level of the received waves, control means responsive to said tone voltages and to said noise voltage to produce a control voltage when a tone voltage exceeds said noise voltage by a predetermined amount, register means including a first counter tube having a plurality of electrodes, means connecting said electrodes to said control means for selectively applying four of said control voltages thereto, with two of said four control voltages being applied simultaneously to energize one of said electrodes, and pulsing means coupled to said register means including a pulse source and a second counter tube, said second counter tube including a plurality of electrodes energized in sequence in response to pulses from said pulse source, means responsive to said fifth control voltage for initiating operation of said register means and said pulsing means, said pulsing means including circuit means coupled to predetermined ones of said electrodes of said second tube and responsive to energization thereof to provide dial pulses, said circuit means being coupled to said first counter tube and applying pulses thereto to cause said electrodes thereof to be energized in sequence until a particular electrode thereof is reached.

11. In a telephone system for providing automatic operation between a dial telephone exchange and remote stations connected by radio to said exchange, and wherein said remote stations produce radio frequency waves modulated by tones of particular frequencies to identify the digits of a dialed number, the combination including, receiver means for deriving tones from the received wave, selective means coupled to said receiver means and including portions responsive to tones of five different frequencies for selectively producing five tone voltages, noise balance means coupled to said receiver means and produce a noise voltage proportional to the noise level of the received waves, control means responsive to said tone voltages and to said noise voltage to produce a control voltage when a tone voltage exceeds said noise voltage by a predetermined amount, register means including a first counter tube having a plurality of electrodes, means connecting said electrodes to said control means for selectively applying four of said control voltages thereto, with two of said four control voltages being applied simultaneously to energize one of said electrodes, one of said electrodes forming the home position and being energized for digit 0, and the remaining electrodes being energized for digits 1 through 9 respectively, and pulsing means coupled to said register means including a pulse source, a second counter tube coupled to said pulse source and including a plurality of electrodes energized in sequence in response to pulses from said pulse source, a pulse relay, and a transistor circuit, said transistor circuit coupling predetermined ones of said electrodes of said second tube to said pulse relay and responding to energization of said electrodes to operate said relay to provide dial pulses, said transistor circuit being coupled to said first counter tube and applying pulses thereto in response to energization of a predetermined electrode of said second tube to cause said electrodes of said first tube to be energized in sequence until said electrode representing digit 0 is reached, means responsive to said fifth control voltage for initiating operation of said register means and said pulsing means, a first relay connected to said electrodes of said first tube representing digits 1 through 9 and holding said pulsing means operative when such electrodes are energized, and a second relay connected to said electrode of said first tube representing digit 0 through said first relay and operative when such electrode is energized after said first relay has been actuated, said second relay being connected to said pulsing means to terminate the pulsing operation.

References Cited in the file of this patent

UNITED STATES PATENTS

| | | |
|---|---|---|
| 2,373,134 | Massoneau | Apr. 10, 1945 |
| 2,619,528 | Vroom | Nov. 25, 1952 |
| 2,654,002 | Hooijkamp et al. | Sept. 29, 1953 |
| 2,698,878 | Martens | Jan. 4, 1955 |
| 2,806,903 | Hargreaves et al. | Sept. 17, 1957 |
| 2,909,606 | Wennemer | Oct. 20, 1959 |
| 2,935,572 | Hastings et al. | May 3, 1960 |
| 2,957,048 | Collins | Oct. 18, 1960 |
| 2,966,659 | Dahlbom et al. | Dec. 27, 1960 |
| 3,004,106 | Low | Oct. 10, 1961 |